(12) United States Patent
Takahashi et al.

(10) Patent No.: US 7,367,182 B2
(45) Date of Patent: May 6, 2008

(54) EXHAUST EMISSION CONTROL DEVICE FOR AN INTERNAL COMBUSTION ENGINE

(75) Inventors: Hideyuki Takahashi, Tokyo (JP); Katsunori Umezawa, Tokyo (JP); Yasuhiro Tsutsui, Tokyo (JP)

(73) Assignee: Mitsubishi Fuso Truck and Bus Corporation (JP)

( * ) Notice: Subject to any disclaimer, the term of this patent is extended or adjusted under 35 U.S.C. 154(b) by 0 days.

(21) Appl. No.: 10/830,706

(22) Filed: Apr. 23, 2004

(65) Prior Publication Data

US 2005/0000209 A1   Jan. 6, 2005

(30) Foreign Application Priority Data

Apr. 25, 2003  (JP) .............................. 2003-122560

(51) Int. Cl.
 *F01N 3/00* (2006.01)
(52) U.S. Cl. ............... 60/286; 60/274; 60/289; 60/295; 60/297; 60/303; 422/170; 422/177; 422/182
(58) Field of Classification Search .................. 60/274, 60/284, 286, 295, 297, 303, 311; 422/170, 422/171, 172, 177, 182, 183
See application file for complete search history.

(56) References Cited

U.S. PATENT DOCUMENTS

| | | | | |
|---|---|---|---|---|
| 4,359,863 A | * | 11/1982 | Virk et al. ............. | 60/297 |
| 4,449,362 A | * | 5/1984 | Frankenberg et al. ....... | 60/274 |
| 4,522,027 A | * | 6/1985 | Hasegawa et al. .......... | 60/274 |
| 4,557,108 A | * | 12/1985 | Torimoto ............. | 60/286 |
| 5,014,509 A | | 5/1991 | Broering et al. | |
| 5,207,990 A | * | 5/1993 | Sekiya et al. ............. | 422/183 |
| 5,711,149 A | * | 1/1998 | Araki ................. | 60/278 |
| 5,771,683 A | * | 6/1998 | Webb ................. | 60/274 |
| 6,708,486 B2 | * | 3/2004 | Hirota et al. ............. | 60/297 |
| 6,832,473 B2 | * | 12/2004 | Kupe et al. ............. | 60/286 |
| 2004/0112046 A1 | * | 6/2004 | Tumati et al. ........... | 60/297 |

FOREIGN PATENT DOCUMENTS

JP     2000-170526 A   6/2000
JP     2000-186545 A   7/2000

OTHER PUBLICATIONS

Foreign Office Action dated Jun. 23, 2006 in a counterpart Chinese application No. 200410035140.9 filed Apr. 23, 2004.

* cited by examiner

*Primary Examiner*—Tu M. Nguyen
(74) *Attorney, Agent, or Firm*—Rossi, Kimms & McDowell LLP

(57) ABSTRACT

A forced regeneration device which performs regeneration of a particulate filter includes oxidation catalysts (23, 24*a*) disposed upstream from the particulate filter or in said particulate filter and a burner (30) located upstream from the oxidation catalysts and operable switching between a combustion mode for combusting a fuel spray by inflammation to raise temperature of exhaust gases in an exhaust passage and a fuel supply mode for supplying only a fuel spray to the exhaust passage without inflammation. After the burner operates in the combustion mode, the burner operation is switched to the fuel supply mode.

7 Claims, 5 Drawing Sheets

EXHAUST EMISSION CONTROL DEVICE FOR AN INTERNAL COMBUSTION ENGINE

BACKGROUND OF THE INVENTION

1. Field of the Invention

The present invention relates to an exhaust emission control device for an internal combustion engine, and more specifically to the technology of regenerating a particulate filter for capturing particulate matter contained in the exhaust gases.

2. Description of the Related Art

The exhaust gases emitted from a diesel engine mounted on a bus, truck and the like, include a large quantity of minute particulate matter (hereinafter abbreviated as PM), besides HC, CO, NOx, etc. Therefore, as a postprocessing device of a diesel engine, a diesel particulate filter (hereinafter abbreviated as DPF ad libitum), which has a configuration in which after the PM is captured, the trapped PM is directly incinerated by an external heat source, such as a burner, has been developed and come into practical use.

For instance, there is disclosed a device having a configuration in which a combustion heater is utilized to increase the temperature of exhaust gases and further the temperature of a DPF by combustion heat, and at the same time a combustion gas or vaporization fuel produced by the combustion heater in a high exhaust temperature is supplied to an exhaust emission control device (for example, a DPF having an oxidizing function) as an additive to eliminate the PM by reaction heat generated on the DPF (for example, Unexamined Japanese Patent Publication No. 2000-186545).

There has been recently developed a continuous regeneration-type DPF in which an oxidation catalyst that produces an oxidizing agent ($NO_2$) for oxidizing and eliminating the PM is separately provided upstream from the DPF, to thereby eliminate the PM in the DPF continuously without an external heat source.

Even with the continuous regeneration-type DPF, if the engine temperature is low, or the like, the PM trapped in the DPF cannot be completely eliminated depending on the operating conditions, resulting in the accumulation of the PM. Therefore, even if the continuous regeneration-type DPF is provided, there needs to be means, such as an external heat source, for forcibly incinerating the PM trapped in the DPF.

According to a method for directly incinerating the PM by an external heat source, such as the above burner, however, the DPF is directly heated by flame. Consequently, while this method has an easy and inexpensive configuration, there is a problem that there generates unevenness in the PM combustion and that the PM in the outer circumferential portion of the DPF cannot be satisfactorily eliminated. Moreover, in this case where the DPF is directly exposed to flame, there is great fear that the DPF is liable to be melted and damaged by being overheated.

In the case of a technology using the combustion heater described in the above patent document, the combustion heater is designed basically to raise the temperature of the cooling water of the engine. Therefore, heat loss is great for raising the temperature of the DPF. If the temperature rise of the DPF is prioritized, it creates a problem that the engine is applied with unnecessary heat load since the temperature of the cooling water is increased too much during the summer season, and the like, in which the outside air temperature is high. Moreover, the combustion heater is provided with a vaporizing glow plug besides an ignition glow plug to vaporize fuel by carrying electricity to the vaporizing glow plug during a non-operation period of the combustion heater, which complicates the device and greatly deteriorates the energy efficiency.

SUMMARY OF THE INVENTION

The present invention has been made to solve the above problems, and an object thereof consists in providing an exhaust emission control device for an internal combustion engine, which is capable of efficiently regenerating a particulate filter in spite of a simple and inexpensive configuration thereof.

To accomplish the above object, the exhaust emission control device for an internal combustion engine according to the present invention comprises a particulate filter being interposed in an exhaust passage of the internal combustion engine and capturing particulate matter contained in exhaust gases and a forced regeneration device for forcibly incinerating the particulate matter captured in the particulate filter and regenerating the particulate filter, the exhaust emission control device in which the forced regeneration device includes oxidation catalysts provided upstream from the particulate filter or in the particulate filter and a burner located upstream from the oxidation catalysts and operable switching between a combustion mode for combusting a fuel spray by inflammation to raise temperature of exhaust gases in the exhaust passage and a fuel supply mode for supplying only a fuel spray to the exhaust passage without inflammation, and after the burner operates in the combustion mode, the burner operation is switched to the fuel supply mode.

A further scope of applicability of the present invention will become apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, are not limitative of the present invention, and wherein.

DETAILED DESCRIPTION OF THE PREFERRED EMBODIMENTS

Figure 1:
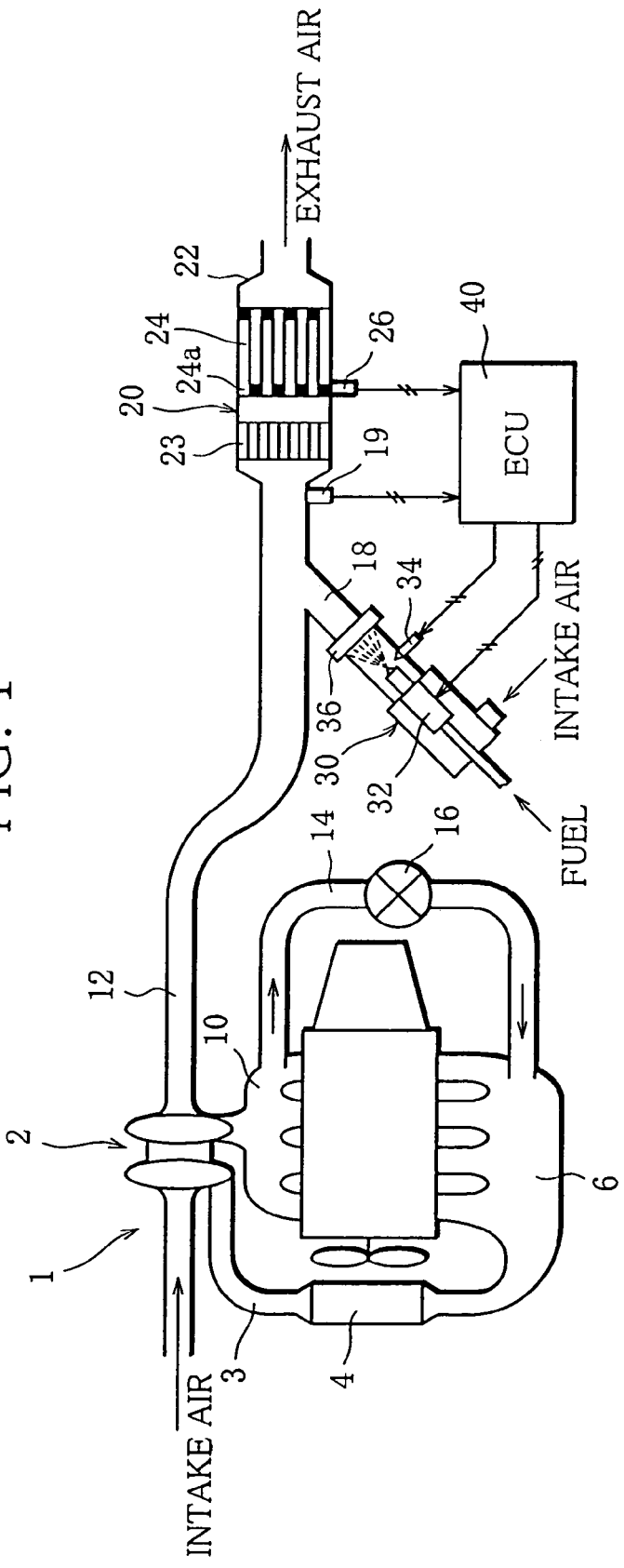
FIG. 1 is a schematic view of a configuration of an exhaust emission control device for an internal combustion engine according to the present invention.

FIG. 1 schematically shows an exhaust emission control device for an internal combustion engine according to the present invention.

An engine 1 is for example a diesel engine and has a cylinder layout of an in-line four-cylinder type. There is mounted a turbocharger 2 in an intake passage 3 of the engine 1. Intake air supercharged by the turbocharger 2 flows into an intake manifold 6 through an inter cooler 4.

A fuel supply system of the engine 1 is constructed from a common rail system, for example. Although not shown, the system includes a common rail and an injector for each cylinder. As the common rail system is known, the detailed description of configuration of the common rail system will be omitted.

Exhaust ports for respective cylinders in the engine 1 are collected into one pipe by an exhaust manifold 10 and connected to an exhaust pipe 12. There is provided an EGR passage 14 between the exhaust manifold 10 and the intake manifold 6. An EGR valve 16 is interposed in the EGR passage.

Connected to the exhaust pipe 12 is an exhaust emission postprocessing device 20. The exhaust emission postprocessing device 20 accommodates a DPF (diesel particulate filter) 24 for capturing PM (particulate matter) in the inside of a cylindrical casing 22 and is configured by arranging an oxidation catalyst (oxidation catalytic converter) 23 upstream from the DPF, facing in an exhaust direction.

Specifically, the oxidation catalyst 23 has a function of generating $NO_2$, and a continuous regeneration-type DPF is constructed from the oxidation catalyst 23 and the DPF 24. This makes it possible to constantly incinerate the PM accumulated in the DPF 24 by using $NO_2$ generated by the oxidation catalyst 23 as an oxidizing agent during the ordinal operation in which exhaust temperature is high in a measure and higher than a given temperature. In other words, the DPF 24 can be continuously regenerated.

Furthermore, there is provided an oxidation catalyst portion 24a in an upstream portion of the DPF 24, facing in the exhaust direction. Therefore, the DPF 24 is so constructed as to be capable of performing an oxidization treatment of exhaust gas components, such as HC, CO, etc.

There is also disposed a temperature sensor 26 for detecting the temperature of the DPF 24 correspondingly to the oxidation catalyst portion 24a of the DPF 24. An exhaust pressure sensor 19 for detecting an exhaust pressure in the exhaust pipe 12 is provided upstream from the oxidation catalyst 23, facing in the exhaust direction.

A combustion gas passage 18 branches off from the exhaust pipe 12 and extends upstream of the exhaust emission postprocessing device 20. The combustion gas passage 18 has a terminal end provided with a burner 30 which produces combustion flame by using the same fuel (diesel oil or the like) as the engine 1, for example. The combustion gas passage 18 and the burner 30 are coupled to each other by a flange 36.

The burner 30 comprises an injector 32 and an igniter 34 serving as an ignition device and functions as a self-igniting burner. Specifically, the injector 32 and the igniter 34 are electrically connected to an ECU (electrical control unit) 40. The burner 30 injects a given amount of fuel from the injector 32 in response to a signal from the ECU 40 and can ignite the injected fuel through the igniter 34 in an instant. Stated differently, the burner 30 is so designed to combust the fuel injected from the injector 32 (combustion mode operation) and inject only fuel from the injector 32 without performing inflammation through the igniter 34 (fuel supply mode operation).

The ECU 40 is a control device for performing overall control of the exhaust emission control device for an internal combustion engine according to the present invention, including the engine 1, and consists of a CPU, a memory, a timer counter, etc.

Connected to an input side of the ECU 40 are various kinds of sensors in addition to the exhaust pressure sensor 19, the temperature sensor 26, etc. Connected to the output side of the ECU 40 are various kinds of devices besides a fuel injection valve, the injector 32, the igniter 34, etc.

Hereinafter, DPF forced regeneration control (forced regeneration device) according to the present invention, which is implemented by the exhaust emission control device constructed as above, will be described.

Figure 2:
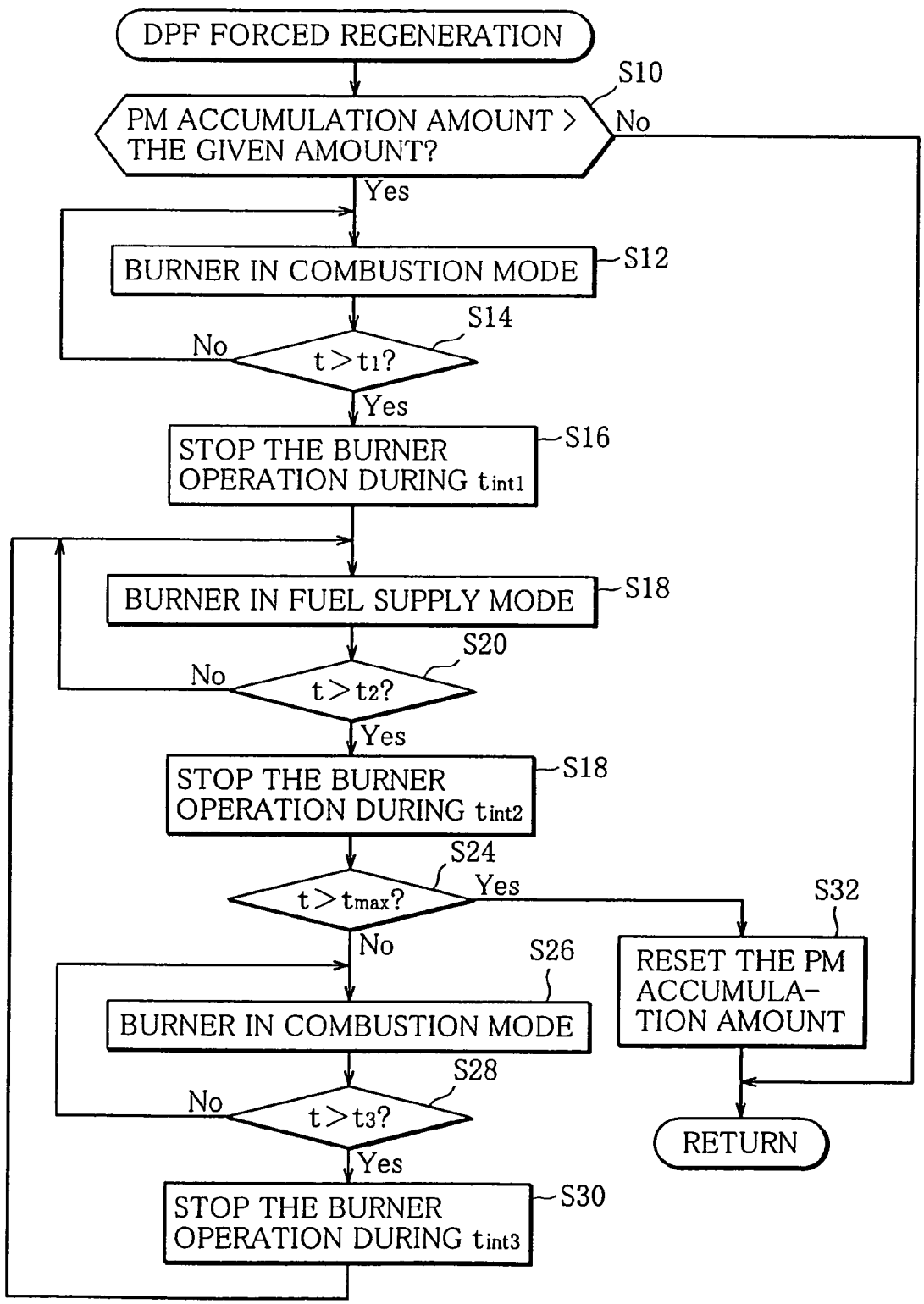
FIG. 2 is a flowchart showing a routine of forced regeneration control of a DPF according to the present invention.
Figure 3:
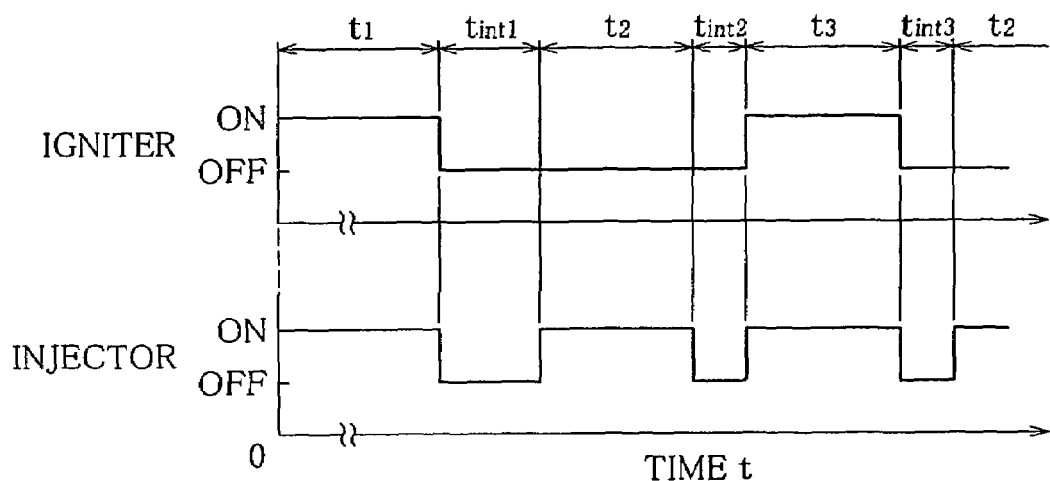
FIG. 3 is a time chart of the forced regeneration control.

FIG. 2 is a flowchart showing a routine of the forced regeneration control of the DPF 24, which is performed by the ECU 40, and FIG. 3 is a time chart of the forced regeneration control. The DPF forced regeneration control will be explained below along the flowchart with reference to the time chart.

First, Step S10 determines whether a PM accumulation amount exceeds a given amount (PM accumulation amount>the given amount). If the PM accumulation amount of the DPF 24 is increased to cause the filter clogged, it hinders a smooth flow of the exhaust gases and raises the exhaust pressure. Therefore, based on exhaust pressure information from the exhaust pressure sensor 19, when the exhaust pressure exceeds a given pressure, it is determined that the PM accumulation amount becomes greater than the given amount. In case that the exhaust temperature is equal to or lower than a given temperature, the oxidation catalyst 23 is not in an active state, and the continuous regeneration of the DPF 24 is not performed. Therefore, the determination may be made after estimating the PM accumulation amount of the DPF 24, based on total operating time of the engine 1 in a region where the exhaust temperature is low.

When a determination result of Step S10 is negative (NO), and it is determined that the PM accumulation amount is equal to or less than the given amount, nothing is done, and the process exits from the routine. In this case, if the exhaust temperature is higher than the given temperature to a relatively great degree, it can be considered that the DPF 24 is satisfactorily continuously regenerated by action of $NO_2$ produced by the oxidation catalyst 23 as stated above.

When the determination result of Step S10 is affirmative (YES), and it is determined that the PM accumulation amount exceeds the given amount, the process then advances to Step S12.

In Step S12, the burner 30 operates in the combustion mode. Both the injector 32 and the igniter 34 are turned ON, and a given amount of fuel is injected from the injector 32 and simultaneously inflamed by the igniter 34, thereby leading the combustion gas of the burner 30 through the combustion gas passage 18 and the exhaust pipe 12 to the exhaust emission postprocessing device 20. In this case, the combustion flame does not reach the exhaust emission postprocessing device 20, and the high-temperature combustion gas increases the temperature of the oxidation catalyst 23 and DPF 24.

Step S14 determines whether an elapsed time t has passed a given time $t_1$ after the burner 30 operates in the combustion mode. Herein, the given time $t_1$ is beforehand set to for example a time period (for example, 2 minutes) sufficient for the temperature of the oxidation catalyst portion 24a of the DPF 24 to reach the activating temperature. The determination may be directly made as to whether the temperature of the oxidation catalyst portion 24a of the DPF 24 reaches the activating temperature during the burner operates in the combustion mode, based on the information from the temperature sensor 26 (oxidation catalyst temperature-detecting device). In addition, the oxidation catalyst 23 may be provided with a temperature sensor to detect the temperature of the oxidation catalyst 23.

If the determination result of Step S14 is negative (NO), and it is determined that the given time $t_1$ has not yet lapsed, the combustion mode operation is continued. On the contrary, the determination result of Step S14 is affirmative (YES), and it is determined that the given time $t_1$ has lapsed, the process advances to Step S16.

In Step S16, the operation of the burner 30, or fuel injection, is suspended during the given time $t_{int1}$ (for example, 30 seconds). This results in extinction of the combustion flame, and the temperature of the remaining heat of the burner 30 is left to drop to a temperature sufficient to encourage the atomization of the fuel spray.

Step S18 operates the burner 30 in the fuel supply mode. Specifically, only the injector 32 is turned ON, whereas the igniter 34 is turned OFF. Accordingly, fuel is injected from the injector 32 only by the given amount without using the igniter 34 to carry out the ignition. Fuel spray (HC) which has been satisfactorily made into a mist by the remaining heat of the burner 30 is led to the exhaust emission postprocessing device 20 through the combustion gas passage 18 and the exhaust pipe 12.

The fuel spray thus led to the exhaust emission postprocessing device 20 shows excellent oxidative reaction in the oxidation catalyst 23 which has increased in temperature to be activated and the oxidation catalyst portion 24a of the DPF 24. The reaction heat of the oxidative reaction heats the DPF 24 to raise the temperature thereof, thereby smoothly incinerating the PM accumulated in the DPF 24. At this moment, the burner 30 is in the heating state right after operating in the combustion mode and has remaining heat. The remaining heat substantially encourages the atomization of the fuel injected from the injector 32. As a result, the fuel spray immediately shows the oxidative reaction in the oxidation catalyst 23 and the oxidation catalyst portion 24a of the DPF 24, so that the DPF 24 is rapidly heated and raised in temperature, thereby successfully incinerating the PM.

In Step S20, it is determined whether the elapsed time t has passed a given time $t_2$ after the burner 30 operates in the fuel supply mode. Herein, the given time $t_2$ is set to a time period (for example, 45 seconds) required for the temperature of the burner 30 to decrease to a temperature insufficient for the promotion of atomization of the fuel spray by using the remaining heat of the burner 30 as vaporization heat for fuel. If the determination result is negative (NO), and it is determined that the given time $t_2$ has not yet lapsed, the fuel supply mode operation is continued. On the contrary, if the determination result is affirmative (YES), and it is determined that the given time $t_2$ has lapsed, the process advances to Step S22.

Step S22 suspends the operation of the burner 30, namely fuel injection, during the given time $t_{int2}$ (for example, 15 seconds). By doing so, the fuel spray in the combustion gas passage 18 is left until being purged.

Step S24 determines whether the elapsed time t has passed a given time $t_{max}$ after the burner 30 first operates in the combustion mode in Step S12, that is, after the forced regeneration is started. Herein, the given time $t_{max}$ is set to an assumed time period (for example, 10 minutes) required for the given amount of the PM accumulated in the DPF 24 to be completely incinerated. In short, this step decides the end of the forced regeneration. If the determination result is negative (NO), and it is determined that the given time $t_{max}$ has not yet lapsed, the process advances to Step S26.

In Step S26, the burner 30 again operates in the combustion mode. In order to reincrease the temperature of the burner 30 having a temperature insufficient for the promotion of atomization of the fuel spray, the given amount of fuel is injected from the injector 32 and inflamed by the igniter 34. This maintains the burner 30 at a temperature sufficient to encourage the atomization of the fuel spray. Moreover, the combustion gas of the burner 30 further heats the oxidation catalyst 23 and the DPF 24, and the DPF 24 then continues to be heated and increase in temperature. Consequently, the PM accumulated in the DPF 24 is satisfactorily incinerated.

Step S28 determines whether the elapsed time t has passed a given time $t_3$ after the burner 30 again operates in the combustion mode. Herein, the given time $t_3$ is set to for example such a time period (for example, 45 seconds) that the oxidation catalyst 23 and the DPF 24 are not overheated while the temperature of the burner 30 goes up to a temperature sufficient for the promotion of atomization of the fuel spray. In case that the determination result is negative (NO), and it is determined that the given time $t_3$ has not yet lapsed, the combustion mode operation is continued. On the contrary, if the determination result is affirmative (YES), and it is determined that the given time $t_3$ has lapsed, the process advances to Step S30.

Step S30 suspends the operation of the burner 30, or fuel injection, during a given time $t_{int3}$ (for example, 15 seconds). By doing so, the combustion flame is left to go out. The given time $t_{int3}$ may be shorter than the given time $t_{int1}$ since the combustion time of the burner 30 is short, and thus time required for the flame to be extinguished and time for the burner 30 to have a temperature suitable for the promotion of atomization are considered to be short.

After the burner 30 operates in the combustion mode, the process returns to Step S18 to operate the burner 30 in the fuel supply mode again. Thereafter in Step S24, it is determined whether the given time $t_{max}$ has lapsed. If the determination result is affirmative (YES), and it is determined that the given time $t_{max}$ has lapsed, the process advances to Step S32. In Step S32, the PM accumulation amount is reset, and the process exits from the routine, which leads to the end of the forced regeneration.

When the determination result of Step S24 is negative (NO), and it is determined that the given time $t_{max}$ has not lapsed, subsequently the combustion mode and the fuel supply mode are implemented in turn until the given time $t_{max}$ lapses.

Figure 4:
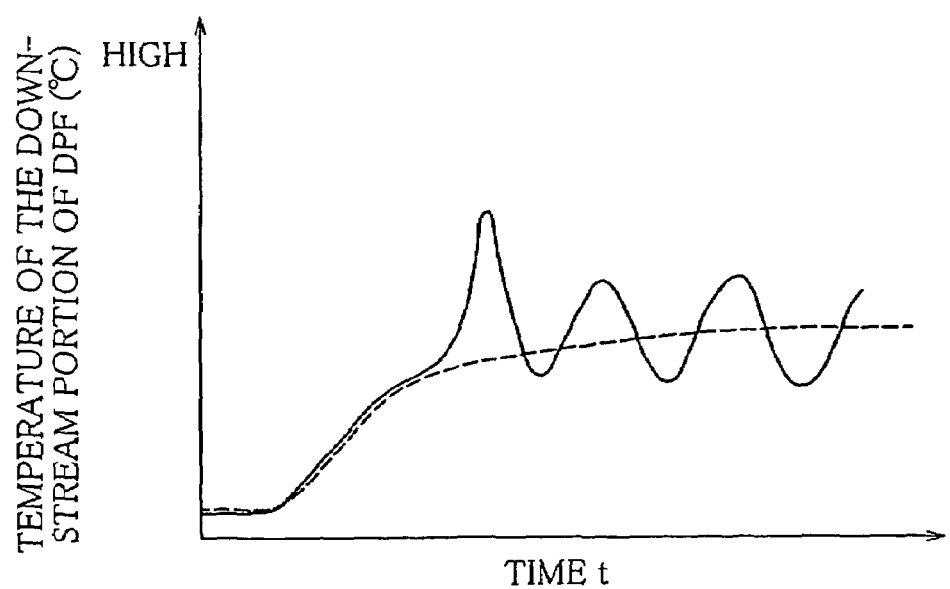
FIG. 4 is a graph showing a time rate of change in temperature of a downstream portion of the DPF.
Figure 5:
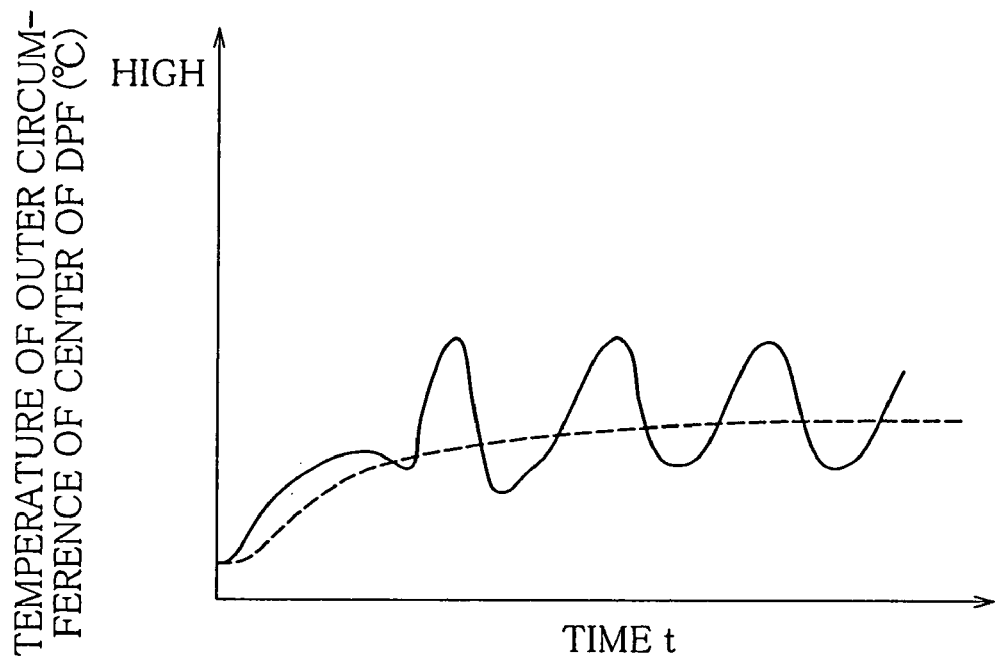
FIG. 5 is a graph showing a time rate of change in temperature of an outer circumference of the center of the DPF.

If the combustion mode and the fuel supply mode are repeatedly implemented as described above with the suspension times for the burner 30 intervening in the routine, as illustrated in FIG. 4 showing a time rate of change in temperature of a downstream portion of the DPF 24 and FIG. 5 showing a time rate of change in temperature of an outer circumference of center of the DPF 24, the downstream portion of the DPF 24 and the outer circumference of center of the DPF 24 both have high temperatures periodically along with the supply of the fuel spray (solid line), while the temperatures slowly increase in case that the burner 30 is continuously combusted as in prior art (broken line). This greatly encourages the incineration of the PM trapped in the DPF 24 through the entire DPF 24, resulting in early achievement of the regeneration of the DPF 24.

Figure 6:
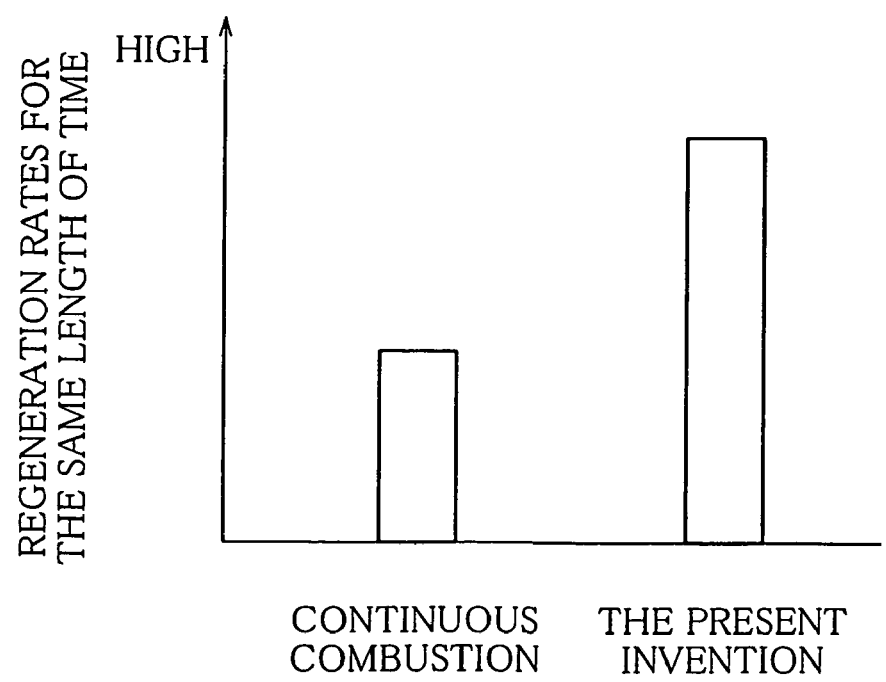
FIG. 6 is a comparative graph showing a DPF regeneration rate obtained in case that a burner is continuously combusted and the DPF regeneration rate obtained in the present invention for the same length of time (for example, 10 minutes)

FIG. 6 shows regeneration rates (the incinerated PM/the trapped PM) of the DPF 24 for the same length of time (for example, 10 minutes), comparing the conventional case in which the burner 30 is continuously combusted to the present invention in which the combustion mode and the fuel supply mode are repeatedly implemented in turn. As illustrated in FIG. 6, the repeating implementation of the combustion mode and the fuel supply mode makes it possible to achieve the regeneration rate which is approximately twice as high as the regeneration rate obtained in the case that the burner 30 is continuously combusted.

With the exhaust emission control device according to the present invention, in spite of the simple and inexpensive configuration using the burner 30, the PM accumulated in the DPF 24 can be incinerated without causing the unevenness of the PM combustion due to the flame of the burner 30 or melting and damaging the DPF 24, without applying an unnecessary load to the engine 1, and without wasting the energy, at the time of the forced regeneration. The regeneration of the DPF 24 is thus efficiently performed.

If the temperature of the oxidation catalyst portion 24a of the DPF 24 reaches the activating temperature during the combustion mode operation of the burner 30, the operation is switched to the fuel supply mode, and the fuel spray is not supplied until the temperature of the DPF 24 fully increases up to the activating temperature of the oxidation catalyst portion 24a, namely a temperature which enables the complete oxidative reaction. Therefore, the fuel spray can be efficiently oxidized by the oxidation catalyst portion 24a.

Since the continuous regeneration-type DPF is constructed from the oxidation catalyst 23 and the DPF 24, it is possible to decrease the frequency with which the forced regeneration is carried out by the burner 30 to a minimum. Moreover, the burner 30 is so located as to supply the combustion gas upstream from the oxidation catalyst 23, so that the oxidation catalyst 23 can increase in temperature to be activated by the combustion heat of the burner 30. As a consequence, the fuel spray can be surely oxidized by using not only the oxidation catalyst portion 24a of the DPF 24 but the oxidation catalyst 23.

Even if the remaining heat of the burner 30 is reduced during the fuel supply mode operation to decrease the temperature of the burner 30, the repeating implementation of the combustion mode and the fuel supply mode allows the burner 30 to retain a temperature sufficient to encourage the atomization of the fuel spray during the forced regeneration. This surely causes the oxidative reaction in the oxidation catalyst portion 24a and the oxidation catalyst 23, which satisfactorily keeps the DPF 24 heated and increased in temperature.

While the embodiment of the present invention has been described, it is not intended that the invention be limited to the foregoing embodiment.

Figure 7:
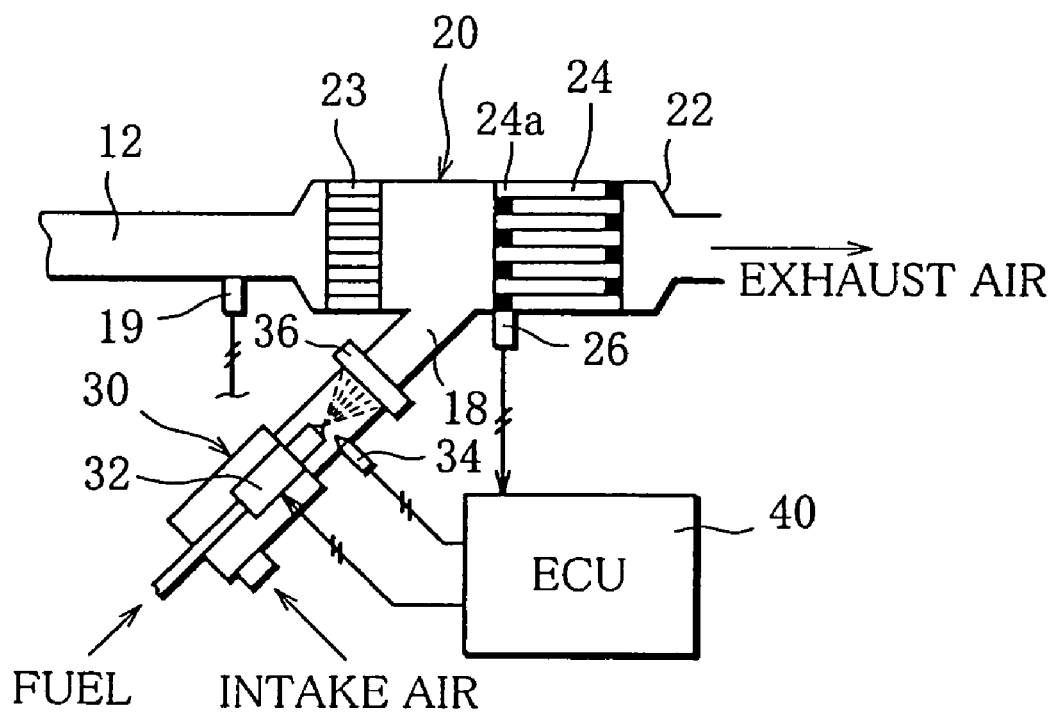
FIG. 7 is a view showing another embodiment of the present invention.

For instance, according to the above-mentioned embodiment, the burner 30 is so located as to supply the combustion gas upstream from the oxidation catalyst 23. According to another embodiment, however, the burner 30 may be so disposed as to supply the combustion gas immediately upstream from the DPF 24, that is, between the oxidation catalyst 23 and the DPF 24, as illustrated in FIG. 7. This makes it possible to successfully promote the oxidative reaction of the fuel spray by using the oxidation catalyst portion 24a of the DPF 24 during the fuel supply mode operation while the oxidation catalyst 23 is prevented from being overheated, thereby efficiently heating the DPF 24 to increase the temperature thereof using the oxidation heat of the oxidative reaction. Consequently, it is possible to incinerate the PM accumulated in the DPF 24 as efficiently as in the aforementioned embodiment.

Furthermore, although in the above embodiment the oxidation catalyst 23 is provided for the continuous regeneration of the DPF 24, the catalyst 23 is not necessarily required. In the absence of the oxidation catalyst 23, the DPF 24 is rapidly and efficiently heated to increase in temperature due to the oxidation heat of the oxidative reaction caused in the oxidation catalyst portion 24a. Therefore, the effects of the invention can be perfectly achieved through the oxidation catalyst portion 24a of the DPF 24.

In addition, although in the aforementioned embodiment the interval periods ($t_{int1}$, $t_{int2}$, and $t_{int3}$), in which the operation of the burner 30 is stopped, are provided between the combustion mode and the fuel supply mode, such interval periods are not always required as long as the combustion mode and the fuel supply mode can be mutually switched at once.

Lastly, although in the aforementioned embodiment the diesel engine is applied as engine 1, the engine 1 is not limited to the diesel engine if only the engine is one which requires the particulate filter for the elimination of the PM.

What is claimed is:

1. An exhaust emission control method for an internal combustion engine, for capturing particulate matter contained in exhaust gases in a particulate filter interposed in an exhaust passage of an internal combustion engine and forcibly combusting the particulate matter captured in said particulate filter with a forced regeneration device to regenerate said particulate filter, said forced regeneration device including oxidation catalysts located upstream from said particulate filter or in said particulate filter and a burner provided upstream from said oxidation catalysts, wherein said burner has an intake air port for introducing fresh air to assist combustion in the burner, the method comprising the steps of:
    (a) operating said burner in a combustion mode for a first predetermined period to combust a fuel spray injected from said burner by inflammation to raise temperature of exhaust gases in the exhaust passage;
    (b) after the step (a), suspending the burner operation for a second predetermined period by stopping fuel supply to the burner for the second predetermined period;
    (c) after the step (b), operating said burner in a fuel supply mode for a third predetermined period to supply only a fuel spray to the exhaust passage without inflammation for the third predetermined period; and
    (d) after the step (c), suspending the burner operation for a fourth predetermined period by stopping fuel supply to the burner for the fourth predetermined period; and
    (e) repeating the steps (a) and (d) for a fifth predetermined period.

2. The exhaust emission control method for an internal combustion engine according to claim 1, wherein said forced regeneration device includes an oxidation catalyst temperature-detecting device for detecting temperature of said oxidation catalysts, wherein the burner operation is switched from said combustion mode to said fuel supply mode when said oxidation catalyst temperature-detecting device detects that the temperature of said oxidation catalysts reaches an activating temperature during said burner operating in the combustion mode.

3. An exhaust emission control device for an internal combustion engine comprising:

a particulate filter interposed in an exhaust passage of an internal combustion engine for capturing particulate matter contained in exhaust gases; and a forced regeneration device for forcibly incinerating the particulate matter captured in said particulate filter and regenerating said particulate filter, wherein said forced regeneration device includes:

oxidation catalysts provided upstream from said particulate filter or in said particulate filter; and a burner provided upstream from said oxidation catalysts, wherein said forced regeneration device allows the burner to operate between a combustion mode for combusting a fuel spray by inflammation to raise temperature of exhaust gases in the exhaust passage a first predetermined period and a fuel supply mode for supplying only a fuel spray to the exhaust passage without inflammation for a second predetermined period, wherein said forced regeneration device suspends the burner operation for a third predetermined period after said burner operates in the combustion mode for the first period by stopping fuel supply to the burner for the third predetermined period, and then switches the burner operation to the fuel supply mode, wherein said forced regeneration device suspends the burner operation for a fourth predetermined period after said burner operates in the fuel supply mode for the second predetermined period by stopping fuel supply to the burner for the fourth predetermined period, and then switches the burner operation to the combustion mode, wherein said forced regeneration device repeatedly implements the combustion mode operation and the fuel supply mode operation for a fifth predetermined period, and wherein said burner has an intake air port for introducing fresh air to assist combustion in the burner.

4. The exhaust emission control device for an internal combustion engine according to claim 3, wherein:

said forced regeneration device includes an oxidation catalyst temperature-detecting device for detecting temperature of said oxidation catalysts; and when said oxidation catalyst temperature-detecting device detects that the temperature of said oxidation catalysts reaches an activating temperature during said burner operates in the combustion mode, the burner operation is switched to the fuel supply mode.

5. The exhaust emission control device for an internal combustion engine according to claim 3, wherein:

said oxidation catalysts comprise an oxidation catalyst portion included in an upstream portion of said particulate filter.

6. The exhaust emission control device for an internal combustion engine according to claim 3, wherein:

said oxidation catalysts comprise an oxidation catalyst portion included in an upstream portion of said particulate filter and an oxidation catalyst converter disposed upstream from said particulate filter.

7. The exhaust emission control device for an internal combustion engine according to claim 3, wherein:

said oxidation catalysts comprise an oxidation catalyst portion included in an upstream portion of said particulate filter and an oxidation catalyst converter disposed upstream from said particulate filter, and said burner is located in between said particulate filter and said oxidation catalyst converter.

* * * * *